Nov. 5, 1968  A. MENGUY  3,409,024
APPARATUS FOR PREPARING TOBACCO LEAVES
Filed Oct. 30, 1967  5 Sheets-Sheet 1
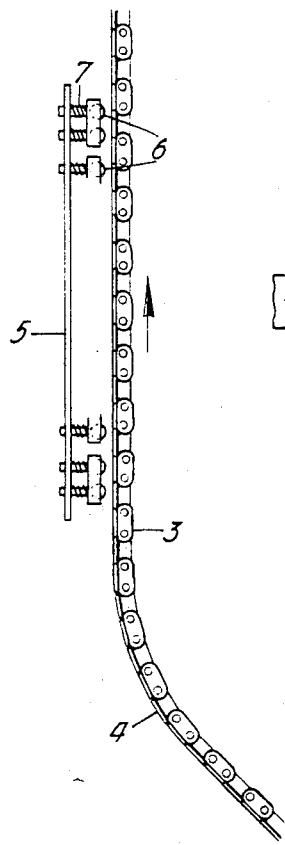
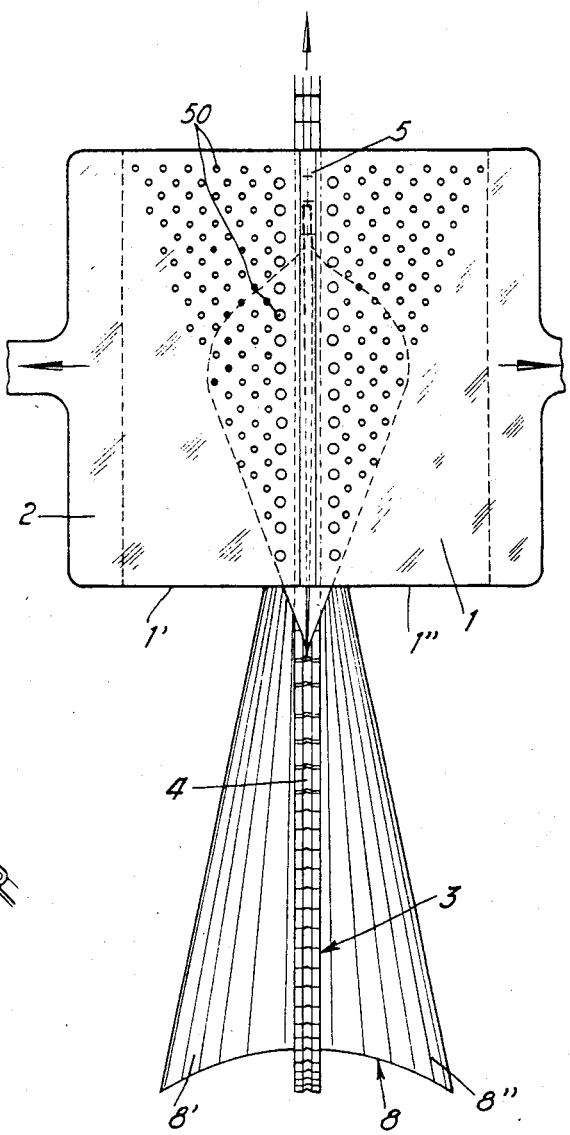
INVENTOR
Alain Menguy
By Sparrow and Sparrow
ATTORNEYS

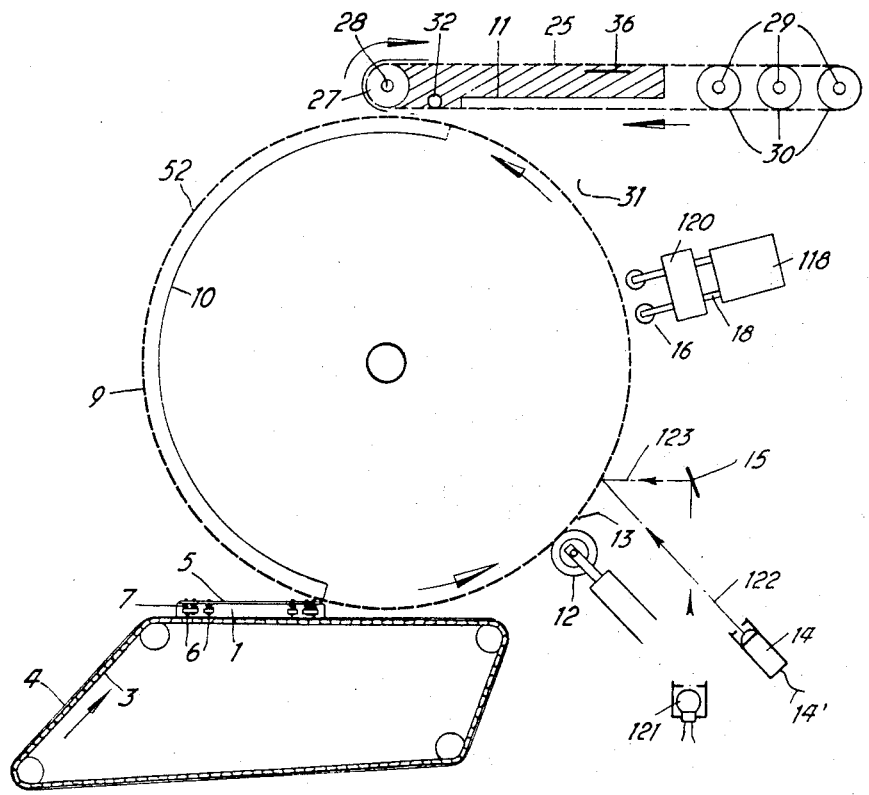
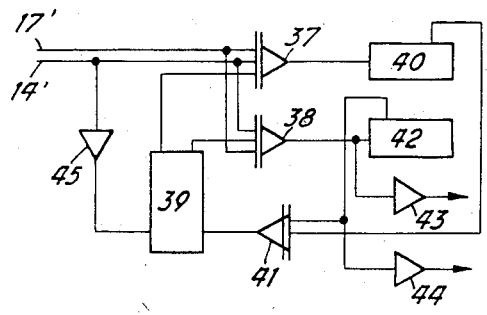

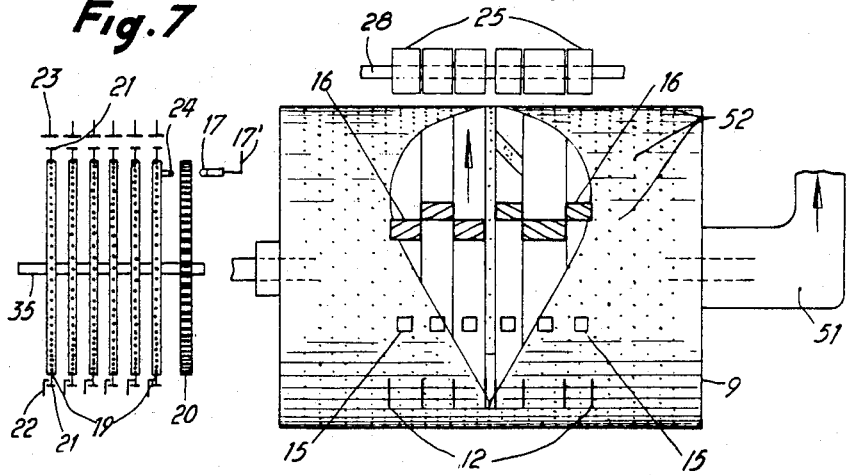
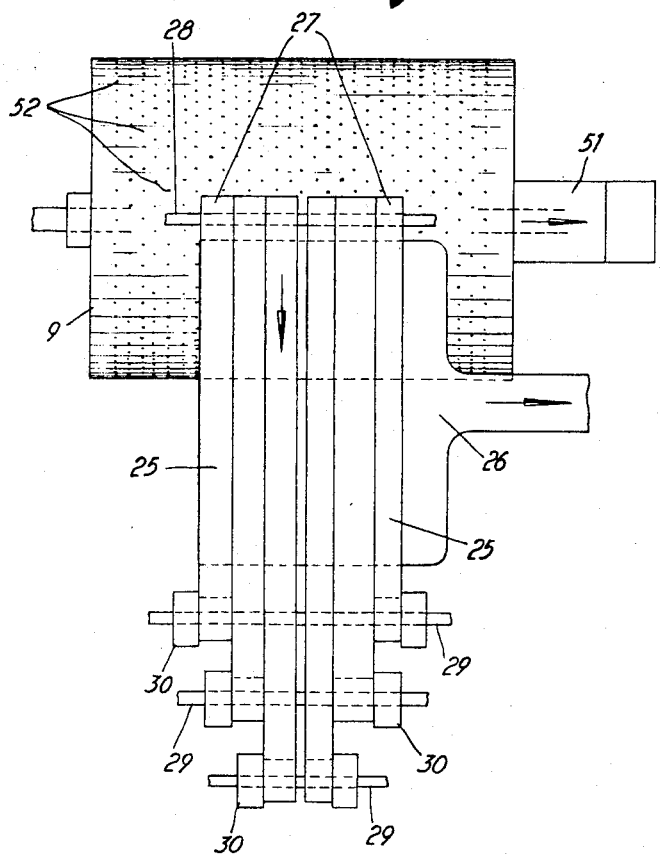
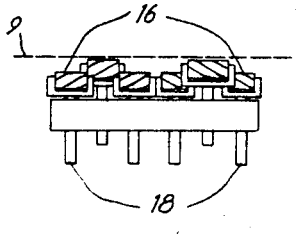

Nov. 5, 1968     A. MENGUY     3,409,024
APPARATUS FOR PREPARING TOBACCO LEAVES
Filed Oct. 30, 1967     5 Sheets-Sheet 4

INVENTOR
Alain Menguy
By
Sparrow and Sparrow
ATTORNEYS

Nov. 5, 1968  A. MENGUY  3,409,024
APPARATUS FOR PREPARING TOBACCO LEAVES
Filed Oct. 30, 1967  5 Sheets-Sheet 5

INVENTOR
Alain Menguy
By
Sparrow and Sparrow
ATTORNEYS

United States Patent Office 3,409,024
Patented Nov. 5, 1968

3,409,024
APPARATUS FOR PREPARING TOBACCO LEAVES
Alain Menguy, 7 Rue de la Krutenav,
67 Strasbourg, France
Continuation-in-part of application Ser. No. 412,351,
Nov. 19, 1964. This application Oct. 30, 1967, Ser.
No. 679,023
Claims priority, application France, Nov. 20, 1963,
954,417; Feb. 14, 1964, 962,640
14 Claims. (Cl. 131—123)

ABSTRACT OF THE DISCLOSURE

A machine for forming strips from tobacco leaves for wrapping of cigars by spreading the leaves, cutting the mid-rib out, splitting the parenchyma of the leaves into adequate strips, scanning the strip for faulty spots and gluing the ends of the strips into one another, measuring the proper length of the strips and cutting them into sections.

---

This application is a continuation-in-part of application Ser. No. 412,351, filed Nov. 19, 1964 and now abandoned.

It is known to produce a continuous strip by mechanical means starting from fragments of tobacco leaves which are applied behind each other so as to form a small overlap at each joint. Such an overlap, which must be arranged by hand, is liable to be too wide. The overlap is in any case too wide if the starting material employed consists of half-leaves which have extended points. If the leaves have previously been trimmed, the rate of utilization is excessive.

Furthermore, tobacco leaves which may even be of good quality sometimes have tears or holes which reduce their value. A continuous strip which is formed by known methods cannot be processed mechanically as it stands if it is either torn or lacerated. An additional operation is therefore necessary in order to cut and re-form the continuous strip, with the substantial overlap which this entails.

In order to dispense with the need for manual operations or unnecessary devices of a special nature, it is a primary object of this invention to cut the outspread parenchyma of each half-leaf on each side of the midrib into a plurality of longitudinal strips which are parallel to said midrib and have a width which is just sufficient for the purpose of wrapping a cigar and which is therefore small, then to cut each strip transversely on the one hand at the beginning and end of the leaf and, on the other hand, before and after each hole or tear of the leaf in order to obtain sections which are subsequently cut transversely to the requisite length so as to form a cigar wrapping, the sections of insufficient length being joined by means of a small overlap to the following section of the same strip so as to give the new section a length which is at least equal to the requisite length.

A further object of this invention is to provide a machine which is designed for the automatic operation of the method referred to above and which essentially comprises means for carrying the midrib and means for spreading out the parenchyma of each leaf, means for receiving and conveying the outspread leaves, means for longitudinal cutting of the outspread leaves into strips, means for detecting holes or absences of parenchyma, means for measuring the length of strips, means for transverse cutting of each strip into sections and controlled by said detection means and by said measuring means, and means for joining sections of insufficient length so as to re-form sections of sufficient length.

The means for carrying the midrib can consist of an endless belt against which the midrib is applied under the action of a pressure exerted, for example, by mechanical members such as spring-loaded push-plates.

The means for spreading out the parenchyma can consist of a box with walls located at a small distance away from each other, between which the leaf is intended to pass and in which a partial vacuum is maintained, said walls being pierced with holes for the admission of air which have a fairly large area in the vicinity of the axis of displacement of the midrib and a smaller area starting from a certain distance away from said axis, said holes being preferably distributed over a surface having substantially the shape of a triangle, the apex of which is directed towards the admission opening.

The means for receiving and conveying outspread leaves can consist of a movable supporting member such as a rotary drum which is pierced over its entire supporting surface with uniformly spaced holes arranged in lines which are set at a uniform distance apart, suction means being provided for the purpose of maintaining the outspread leaf against said surface as it is delivered from the spreading out means.

The longitudinal cutting means can consist of series of cutters such as circular cutters, for example, which are so arranged as to be applied against the supporting member or perforated drum and to cut thereof parallel strips which may or may not be of equal width on each side of the midrib. The midrib which is cut out of the parenchyma can be withdrawn from the action of the perforated drum immediately on completion of the cutting operation by virtue of a means such as a scraper. The longitudinal cutting means divide the surface which supports the outspread leaf into track which each correspond to a cut strip.

In the case of the perforated drum, the holes of which are arranged in rows parallel to the axis of said drum, the means for measuring the lengths of strips which pass along each track of the drum after longitudinal cutting can comprise a disc which is adapted to rotate at the same angular speed as the drum and on the periphery of which are formed a number of notches equal to the number of rows of holes formed in said drum, a light source and a photoelectric cell located on each side of said disc at the level of the notches thereof, and means for counting rhythmical pulses which are emitted by said photoelectric cell and the value of which in units of time corresponds to the time-duration of the sweeping by stationary detection means of the surface which is comprised between two rows of perforations of the drum which are parallel to the axis of said drum.

The means for detecting the absence of tobacco and re-appearance of tobacco on each track of the drum or like supporting means can comprise in the case of each track a rotating mirror illuminated by a parallel beam of light which sweeps the width of each track, and a photoelectric cell energized by the rays which are derived from said mirror but reflected from the supporting surface, and electric means designed to receive the pulses emitted by said photoelectric cell when this latter is energized, that is to say when no tobacco is present on the supporting surface.

The means for effecting the transverse cutting of the strips of each track can consist of cutting members such as rotary cutters with helical cutting edges having a width equal to that of the corresponding track and so arranged as to cut the strips while being brought into contact with the strip supporting member in a line which is inclined with respect to the central plane of the drum, that is to say with respect to the midrib of the leaf, for example a line which is parallel to the lateral nerves or which corresponds to the line of slope of the outer edge of the leaf at the point considered.

The means for joining those sections of strips which are of insufficient length and for reconstituting sections of sufficient length can consist of conveyor belts corresponding in number to the number of tracks of the member which supports the cut strips, said conveyor belts being designed by incorporation of suction means, for example, to withdraw sections of insufficient length which have been cut on the aforesaid supporting member or drum as soon as said sections are released for example by means of an obturating shell if the retaining means are suction means, said conveyor belts being provided with disengageable drive means controlled as a function of the time which has elapsed between the transverse cutting operations before and after a zone in which no tobacco is present, in such manner that the gummed end of a complementary strip section covers and is applied under the action of a pressure finger, for example, against the end of the preceding section.

The control system of the machine, when it is of electronic design, can comprise a logic circuit which essentially consists of two pulse counters and two "AND" gates controlled by a bistable device and arranged on the one hand so as to cancel the counting of pulses for measuring strip lengths each time the count reaches a value corresponding to the length of strip which is required for the wrapping of a cigar and, on the other hand, so as to deflect said measuring pulses from the counter as soon as the absence of tobacco is detected, one or a number of pulses corresponding to the length of overlap which is necessary for the sections to be joined being also deflected from the counting means after reappearance of the tobacco.

A storage system of the magnetic or mechanical type, for example of the type comprising studded discs with two positions can be employed for the purpose of recording the pulses which are supplied when the tobacco is present and for the purpose of controlling on the one hand the gumming of the overlapping ends of complementary strip sections and, on the other hand, the means for joining sections of insufficient length and re-forming sections of sufficient length such as, for example, conveyor belts which take the sections from the drum or like support on which said sections are cut out.

The transverse cutting means are designed in this case to come into operation at each pulse-deflection and on completion of the counting which corresponds to the desired strip.

One example of construction of the machine in accordance with the invention has been illustrated in the accompanying drawings which are given solely by way of example and not in any limiting sense, and in which:

FIG. 1 is a plan view of the means for transferring and spreading the leaf;

FIG. 2 is a view in cross-section on a larger scale of the device for pressing the midrib of the leaf as shown in FIG. 1;

FIG. 3 is a diagrammatic view in cross-section of the complete machine;

FIG. 4 is a view in elevation of the rear of the machine which shows the drum for the preparation of sections and for detecting the absence of tobacco;

FIG. 5 is a plan view of the cutting devices with helical cutting edges;

FIG. 6 is a plan view of the machine showing the drum and individual conveyor belts;

FIG. 7 is a view in side elevation of the electromechanical storage system;

FIG. 8 is a general arrangement diagram of the electronic device for counting, cutting control and stopping of individual conveyor belts;

Figure 9:
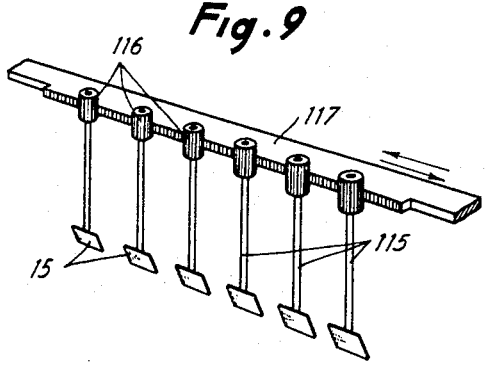
FIG. 9 is a detail view of the drive of the mirrors, shown in perspective, partly broken away.

In the example which is illustrated, the machine comprises a relatively flat box 1 (as shown in FIG. 1) which communicates with a reduced-pressure source through a conduit 2 and which is divided across the width thereof into two equal parts between which is adapted to travel an endless chain 3. There is mounted on each link of the chain 3 a small plate 4 in which is formed a round-bottomed groove. The assembly of plates 4 thus constitutes a continuous strip provided with an axial groove. Within the space which is delimited by the two parts of the box 1, there is mounted a pressing device 5 which is provided with rollers 6 acted upon by springs 7 which exerts pressure on the plates 4 throughout the length of the box 1.

The top and bottom faces of the box 1 are pierced with holes 50 which are of relatively substantial area along the device 5 and the chain 3 and which have a smaller area over that portion of surface which is substantially located between the device 5 and the diagonal line of the half-boxes 1' and 1" in such a manner that the summits of the triangles which are thus formed are directed towards the upstream end. Two half-casings 8' and 8" having a rounded section are placed in front of the box on each side of the chain.

There is mounted above the endless chain 3 a hollow drum 9 (as shown in FIGS. 3, 4 and 6), the interior of which is connected to a reduced-pressure source by means of an axial conduit 51. The side wall of said drum is pierced with a series of uniformly spaced holes 52 approximately 5 mm. in diameter, said holes being relatively displaced from one line to another. Said drum can be driven in rotation in the direction of the arrow (as shown in FIG. 3) and a stationary shell 10 is mounted in the interior of said drum in such manner as to close off the holes 52 which pass directly above the shell.

There are mounted opposite the drum 9 and parallel to a generator-line of said drum a series of eight circular cutters 12 having an adjustable spacing (as shown in FIGS. 3 and 4) and continuously applied against the drum 9 with their cutting edges at right angles to the generator-line of said drum. The cutting edges pass between the perforations 52 and delimit on each side of the central plane of the drum corresponding to the midrib of the tobacco leaf three tracks which correspond to the strips of tobacco to be cut out in said leaf. There are then disposed in the axes of the six tracks thus formed, and also in parallel relation with the generatrices of the drum, first of all a series of six rotating mirrors 15 which are adapted to cooperate with six photo-electric cells 14, then six cutters 16 with helical cutting edges (as shown in FIGS. 4 and 5) and six gumming devices 31 (as shown in FIG. 3). A scraper 13 is mounted in the central plane downstream of the cutters 12.

Mirrors 15 rotate about a vertical, geometric, fixed axis, embodied by a shaft 115 (FIG. 9); shafts 115 are driven in alternating directions of a small amplitude by small gears 116 meshing with a horizontal rack 117 which is moved back and forth by conventional means, not shown in the drawing and not a subject of the invention.

The mirrors 15 sweep transversely at high speed each of the tracks assigned thereto and each photoelectric cell 14 is mounted in opposite the corresponding mirror 15 in such a manner as to be energized by the light rays which are reflected from the metallic surface of the drum 9.

Figure 10:
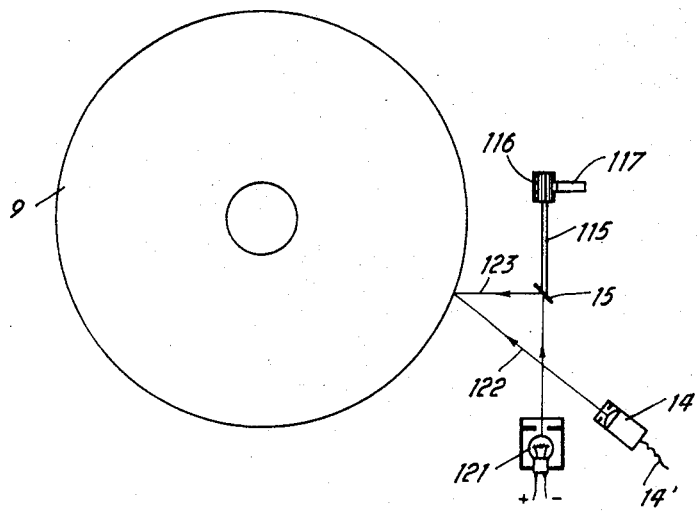
FIG. 10 is an enlarged detailed view of the arrangement of the scanning devices shown in FIG. 3.

A light source 121 (FIG. 10) which is located in the direction of shaft 115 of mirror 15, corresponds to this mirror. The photo-electric cell 14 is arranged in such manner as to receive the bundle of light rays which is reflected by drum 9 in the zone of scanning the tobacco strips; in other words, the axis 122 of cell 14 is symmetrical of the reflected light beam 123 with respect to a radial line drawn through the scanned point on drum 9.

Figure 11:
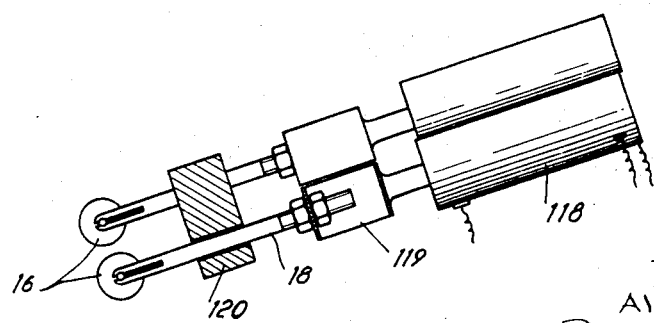
FIG. 11 is an enlarged detail view of the cutters and the shafts thereof, as shown in FIG. 3.

Each photoelectric cell 14 is connected to a photodiode 17 (as shown in FIG. 7). The cutters 16 are mounted on shafts 18 (as shown in FIG. 5) which are controlled, for example, by solenoids 118 in such manner as to apply each cutter at the appropriate moment against the drum 9. To that extent shafts 18 are slidably arranged in fixed supports 120 (FIG. 11). Each shaft 18 is aligned with the coil of double-acting solenoid 118 and is attached by means of the threaded end thereof and a nut and counternut to a stirrup 119 which forms part of the soft iron core of the solenoid. Thus, a cutter 16 can be forwarded to the surface of drum 9 and retracted therefrom very rapidly. The helical angle of each cutting edge of the cutters is so determined that the pressure with which said cutters are applied against the drum 9 produces a line having the desired angle of inclination. Each of the cutters 16 is adapted to rotate about an axis which is parallel to the generator-line of the drum 9. Said cutters are set in staggered arrangement on two generatrices of drum 9 and can each comprise four helical cutting edges and, in such a case, are designed to rotate through one quarter of a revolution each time they are applied against the drum 9. The movement of rotation of the cutters 16 can be free and result solely from their contact with the drum 9 under the action of solenoids 118.

As shown in FIG. 4, the drum 9 is provided with small perforations which are uniformly distributed with a spacing of the order of one half centimeter. The arrangement of the cutters 12 and 16 is such that the cutting edges thereof pass between the perforations of the drum 9.

There are mounted above the drum 9 six horizontal conveyor belts 25, each of which corresponds to one of the tracks delimited by the cutters 12 (as shown in FIGS. 3, 4 and 5). Said conveyor-belts 25 pass on the one hand over rollers 27 which are mounted to rotate freely on a same shaft 28 placed in parallel relation with a generatrix of the drum 9 and, on the other hand, over pairs of rollers carried by parallel shafts 29 which are continuously driven in rotation and which are additionally provided with clutch-coupling and braking units 30 where by the movement of each of said conveyor-belts 25 can be separately controlled. Clutch-coupling and braking units 30 consist of electromagnetic engaging and electric braking parts which are coaxial with shafts 29 and are keyed thereon. They are controlled by the storage system constituted by discs 19 in such manner that one is excited while another is released, or vice-versa, by the electric current passing through reversing relays. Said conveyor-belts are provided with perforations and a reduced-pressure system which is designed to operate between the top and bottom runs of said conveyor-belts, said reduced-pressure system being made up of a casing which is delimited by a partition 11 and which is connected to a vacuum source through the conduit 26. The shaft 28 is located at a suitable distance away from the drum 9 depending on the suction power exerted through the perforations of the conveyor-belts 25 in the zone which is delimited by the partition 11, the length of which is different in the case of each conveyor-belt.

The sucking action which is produced through the conduit 26 and through the perforations of the conveyor-belts 25 is limited to the shaded portion shown in FIG. 3 and a pressure finger 32 is intended to apply the corresponding point of each conveyor-belt 25 against the drum 9. Each finger 32 rotates about a fixed shaft and is displaced against a belt 25 by the action of a small solenoid (not shown in the drawing) and is retracted to its rest position by a spring (not shown in the drawing). In the active position it is pushed strongly against the inner surface of belt 25. This, in turn, is slightly deformed by virtue of its elasticity and thus establishes the contact between two strips of tobacco.

Figure 12:
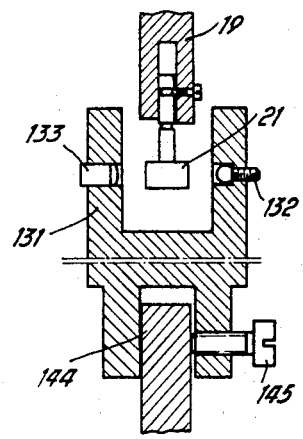
FIG. 12 is a detail sectional view along line XII—XII of FIG. 14 of the scanning device in the mechanical storage system shown in FIG. 7.

As shown in FIG. 7, there are keyed on the same shaft 35 on the one hand six discs 19 each corresponding to one of the tracks of the drum 9 and each provided with small studs 21 corresponding in number of lines of perforations 52 of the drum 9 and, on the other hand, a notched disc 20, the number of notches of said disc being also such as to correspond to the number of lines of holes 52. The studs 31 are capable of taking up two positions, namely a bottom position or rest position and a top position or storage position. Said studs are controlled by means of guide-rails 22 for the purpose of lifting said studs to the top positions thereof and by means of guide-rails 23 for returning said studs to the bottom positions thereof, said guide-rails 22 and 23 being in turn actuated by solenoids, as will be explained hereinafter. When they are located in the storage position, the studs 21 actuate the clutch unit 30 of the conveyor 25 which corresponds to the discs 19 which carries said studs so as to make said conveyor fast for rotation with the shaft 29 and, in consequence, to set said conveyor in motion. As it has been explained above, the "reading" of the "memory device" which consists of the discs 19 and of the studs 21 can be effectuated either optically or by direct contact. For the optical reading a device may be used which is composed of a commercially obtainable photo-electric projector cell of U-shape (131 in FIG. 12) where the studs 21 pass between the branches according to the movement of the disc 19. Upon the instant following the passing of a notch of the disc 19 in front of the photodiode 17, a stud 21 passes either in the depressed or lifted condition between the projector 132 and the cell 138, and the latter gives either a signal of missing or present tobacco at its area. Reading ties (basically three) are also provided for each disc 19 which are needed for signals at various times.

A light source 24 and a photodiode 17 are mounted on each side of the disc 20 opposite the notches of said disc.

The angular speed of rotation of the shaft 35 which carries the discs 19 forming a storage system and the disc 20 is equal to that of the drum 9, in such manner that each stud 21 and each notch of the disc 20 correspond to one row of perforations 52 of said drum 9.

The combined assembly of rotating mirrors 15 form together with the photoelectric cells 14 a system for detecting the presence of tobacco on each track of the drum 9. The light beam which is reflected by the mirrors 15 forms a spot which sweeps the zone to be observed. When no tobacco is present, the light which is reflected from the metallic surface of the drum is directed to the photoelectric cell 14 which delivers a signal indicating the absence of tobacco on the corresponding track.

The assembly which consists of the notched disc 20 of the light source 24 and the photoelectric cell 17 constitutes a system for emitting synchronization pulses, and each of the pulses emitted corresponds to one unit of length representing the length of tobacco between two rows of perforations 52 of the drum 9, that is to say approximately 5 millimeters.

The electronic circuit shown in FIG. 8 which makes use of the pulses supplied from the photoelectric cell 14 via the line 14' and from the photoelectric cell 17 via the line 17' comprises two "AND" gates 37 and 38 which are controlled by a bistable multivibrator 39, the gate 37 being also controlled by the signal which indicates the absence of tobacco and which is derived from the photoelectric cell 14.

The pulses which pass through the gate 37 are recorded by a counter or so-called "overlap counter" 40, the output pulse of which via the "OR" gate 41 trips the bistable device 39, thus opening the gate 38 and giving access to the counter 42 which counts the length of the tobacco and is a set at a pre-determined value.

The absence of tobacco which is detected by the photoelectric cell 14 again trips the bistable multivibrator 39.

The zero indication of the length counter 42 trips the bistable device 39 as soon as the tobacco appears in the detection zone so as not to count any overlap from the time of starting-up of the machine.

A timing device (not shown) serves to reset the counters 40 and 42 to zero at the time of starting-up of the machine. A reversing amplifier 45 resets the system to zero when no no tobacco is present.

The tripping of the multivibrator 39 resets the counter 40 to zero. The position of the multivibrator 39 is recorded in the storage system. The appearance of the zero in the length counter 42 is also recorded in a sector of the storage system for the purpose of controlling the cutting members 16. The storage circuit comprises amplifiers 43 and 44.

The reading of the storage system as performed either by optical means or by contact makes it possible to position the logic elements which will permit the passage of synchronization pulses derived from the photoelectric cell 17 towards the devices for controlling the operations involving cutting, gumming, starting and stopping of the conveyors 25.

The above-mentioned devices are of conventional type comprising relays or electronic logic elements (diodes, transistors, vacuum tubes . . .) while the counters can be either mechanical or electronic.

The operation of the machine is as follows:

The tobacco leaves are laid one by one on the casing 8, the petioles being placed foremost within the groove of the plates 4. The leaf which is conveyed through the box 1 is maintained axially by the system of pressure devices 5, 6 and 7 and is subjected to the progressive suction of the perforation zones 50. The leaf which is thus maintained in the outspread position is transferred as soon as it passes out of the box 1 as a result of the suction of the drum 9 which is exerted at the required moment by virtue of the position of the shell 10. The leaf which is perfectly laid along the axis of its midrib at right angles to the generator-line of the cylinder can be cut out into strips on each side of the midrib, said strips having widths such that, depending on their location in the leaf, they can be put to the most judicious use according to the species of leaves considered. To this end, the spacing between the circular cutters 12 is adjusted accordingly; similarly, the different devices which are mounted and designed for subsequent operations must have dimensions according to the widths of the tracks which correspond to each strip of leaf. The scraper 13 removes the midrib after longitudinal cutting.

The detectors 15 sweep the surface of each leaf strip. The presence of tobacco on the drum 9 does not produce any action of the photoelectric cells 14 and the rhythmical pulses which are delivered to the photodiode 17 from the light source 24 mark one unit on the electronic counter 42 at each passage of one perforation of the drum 9 to which there corresponds the passage of a notch through the photodiode 17. On completion of the counting operation which corresponds to the number indicated by the counter 42 which in turn corresponds to a sufficient length of section, the counter is reset to zero and initiates the cutting of the leaf strip at the required place by means of the cutters 16. The individual conveyor 25 of the track considered continues to move forward and withdraws by suction the section of sufficient length which has thus been cut out. In this case also, the suction of the drum 9 is stopped at the required moment as a result of the position of the shell 10.

The appearance of a hole in the surface of a leaf strip produces, by means of the rays which are reflected from the corresponding rotating mirror 15 and derived from the metallic surface of the drum 9, the energization of the photoelectric cell 14 which is associated with said mirror, thereby deflecting the rhythmical pulse of the photodiode 17 from the electronic counter 42.

The deflection of the pulse produces by means of an electromagnet (which has not been shown in the drawings) the application of the transverse-cutting cutter 16 which is assigned to that track in which the absence of tobacco has been detected on the leaf strip, immediately before the hole.

Figure 14:
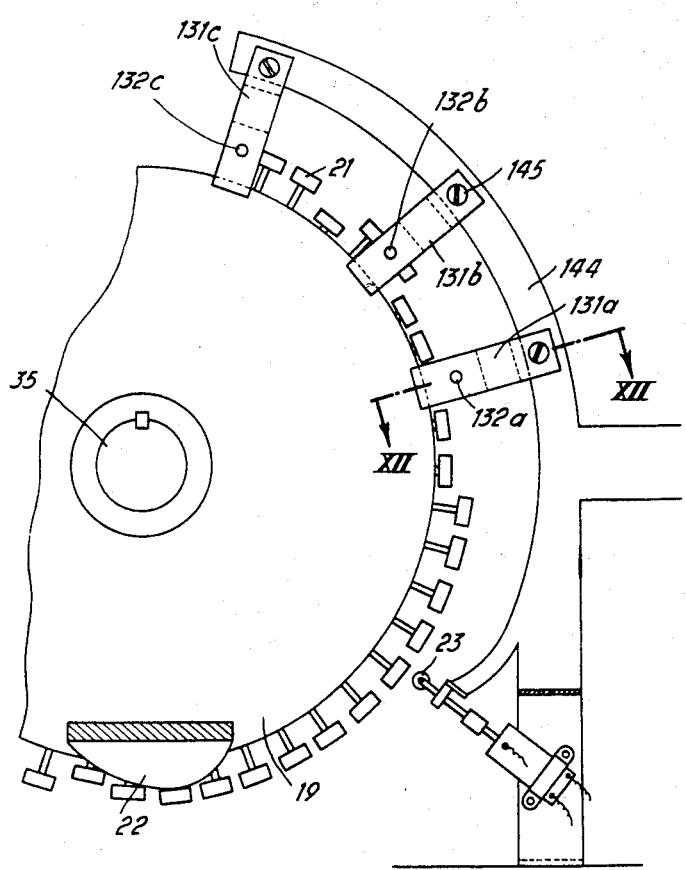
FIG. 14 is an enlarged side view of one of the mechanical storage discs shown in FIG. 7, partly broken away.

As soon as the pulse has been deflected as a result of the absence of tobacco, the guide-rail 23 has the effect of placing in the low position the number of studs 21 which corresponds to the number of perforations which have been moved past in front of the photoelectric cell 14 which has remained energized. The guide rail 22 is stationary and lifts studs 21 by their enlarged end. Studs 21 are located in the positions seen in FIG. 14.

The reappearance of tobacco on the track which is being scanned again initiates the transverse cutting of the strip at the requisite moment in order that the cutting operation should be performed after a hole. The reappearance of tobacco also initiates the gumming by means of the device 31 at the beginning of the strip which has been cut after a hole and also produces the action of the pressing finger 32 at the requisite moment. The operation of the reappearance of tobacco may be explained as follows: The "reading head" 131a (FIG. 14) which is arranged for operating the transverse cutting of the strip, is wired in an electric circuit of the well-known "balance" type which is sensitive to the change of the nature of the received signals. This circuit operates a knife 16' for the transverse cut when the reading head 131a signals the passing of the "full tobacco" state to the "missing" state as well as in the reverse order. A very short time delay prevents the circuit from swinging back when only one signal "missing" has been given by 131a corresponding to a single stud 21, which is the case when the end of a single stud 21, which is the case when the end of a sufficient length of the strip has been marked.

The gumming is controlled by a second reading head 131b which is placed after the head 131a in the direction of the rotation of the discs 19. The head 131b is wired to an electric relay which actuates the gumming device at every change of "full tobacco" state to the "missing" states, except in case when the length counter 42 is at zero which indicates the start of a new strip.

Figure 13:
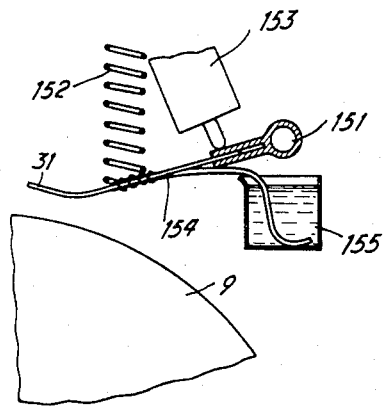
FIG. 13 is a detail view of the gumming finger shown in FIG. 3.

The gumming device for every tobacco lane comprises an applicator finger 31 (FIG. 3) and of an electromagnetic or electropneumatic operating mechanism. As it may be seen in FIG. 13, the applicator fingers are pivotally mounted on a common shaft 151 and are pulled back by tension springs 152. Solenoids 153, energized by the reading heads 131c (FIG. 14), as described above, kick the corresponding finger 31 downward when a gumming signal is given (in response to a reading of a disc 19 and of the counter 42). The signal is transmitted by an appropriate relay which interrupts the energizing current with the preset time delay. The corresponding spring 152 then pulls the finger 31 upwards. The feeding of the adhesive is accomplished by capillary along the shaft 154 of the finger 31 from a common container 155. It is the front end of the strip, either after a hole or at the start of a new leaf, which is glued, when the counter 42 is not yet back to zero. By this manner the gluing of two strip ends is automatically performed, when the rear end of a strip before a hole or the end of a leaf is pushed by the finger 32 across the belt 25 toward the drum 9. The reappearance of tobacco controls at the desired time the pressure finger 32 by the intermediary of reading head 131c (FIG. 14) which also controls the brake coil 30 of one belt 25. However the corresponding relays of finger 32 will not be energized unless the length counter 42 is not at the maximum (or at zero) and energizes the solenoid of finger 32 for a relatively short time only (electric time relay). As it has been explained above the "memory,"

consisting of discs 19, permits to superimpose the end E of a strip, which is cut before a hole over the start L of the following strip. Since the end E covers the perforations of the belt 25 at this instant, it could not assure the pick-up of the start L if there would not be a pressure finger 32 or an equivalent device. As it will be described later, the action of the finger 32 brings the two parts of the leaf strip into contact with one another and thus provides a strong bonding.

The return of the circuit of pulses derived from the photodiode 17 towards the electronic counter 42 for the purpose of continuing the counting process does not immediately take place at the moment when the tobacco reappears on the track which is being scanned. In fact, the counter 40 delays by one, two or three pulses the return to the counter 42 so that the desired overlap can thus be formed between the two sections created before and after the hole by the double cutting operation, over a length which is equal to the distance between one, two or three perforations in the drum 9. The action of the guide-rail 22 on the studs 21 which form part of the corresponding disc 19 of the storage device is continued at a rate of one stud for each pulse during which the return to the counter 42 is delayed.

The number of studs located in the low position causes the corresponding individual conveyors 25 to come to a stop by means of suitable electric contacts which are part of the relays operated by the head 131c and by means of the clutch-coupling and braking units 30 which control said conveyors. The stopping time corresponds to the movement of rotation of the drum 9 between the transverse cutting operations and is increased by the time taken by one, two or three perforations to pass in front of the photoelectric cell 14. In this manner, the strip end which is cut before a hole is held motionless on the conveyors 25 until the moment when the begining of the following strip has passed by a length measured between one, two or three perforations beyond that point of the drum 9 at which the suction is cut off by the shell 10. Thereupon, the re-starting of the movement of the individual conveyor 25 reinitiates the suction which is derived from said conveyor and which was previously interrupted by the leaf strip which closed off its perforations. As soon as the cells 14 receive light impulses from mirrors 15 indicating that the tobacco does not *entirely* cover the scanned area of drum 9, the emitted signal corresponds to a "missing" tobacco. Thus the studs 21 which correspond to the center line of the scanned circle are pushed down. The reading bead 131a, as it has been explained above, actuates the knife 16' of the transversal cut at every extended change of state (more than one stud 21) of the surface condition of disc 19. Thus there are no irregular borders possible. The triangle-shaped outer parts which are cut off on the sides of the leaves are sucked off in the same manner as it has been explained for parts with holes. The action of the pressing finger 32 brings into contact those portions of the leaf strip which are intended to overlap.

The fragments of leaf which surround a hole are not thenceforth drawn by suction against the conveyors 25 but are carried away by the drum 9 and can be recovered for other purposes.

The guide rail 22 thrusts back the studs 21 towards the top positions thereof after they have supplied the information stored by said studs. Guide-rails 23 operate in the same manner as the knives 16 which are attached to shafts 18 (see FIG. 11) with the difference that the knives 16 are replaced with cylindrical rollers of a small diameter. Thus, it is possible to operate a desired number of studs by two electric impulses opposite one another, when a hole in the tobacco occurs or when a signal of the end of a strip is given by counter 42.

The wrapper-leaves are taken from the conveyors 25 by means of suckers (not shown) which are applied in positions defined by the lengths of the wrappers. Movable flaps 36 located in the suction conduit interrupt the suction of the wrapper at the moment when this latter is withdrawn by the sucker. The movable flaps 36 serve the purpose of cutting the suction of the partitions during the pick-up of a strip by transfer vent lines (not shown). They are operated by the vent system itself which does not belong to the machine, by the conventional systems of levers which are set in motion by the rear portion of one of the alternative courses of the vent system. This could be the vertically descending course of the vent which lifts a closing flap 36 parallel to itself; it also could be the horizontal movement of the support arm of the vent which causes a sliding of flap 36, operated like a drawer for closing the suction slots of the partition which normally communicate with the perforations of the belt 25. In both cases an electrical blocking action exists which guards the movement of the vent at the stopping of the conveyor; the flaps 36 return to their position of rest by the action of spiral springs.

The suckers referred to then move towards mechanical wrapping devices of conventional type.

A conveyor 25 can thus supply a number of suckers.

The modules of cigar wrappers which are cut to shape on each track can be different in such manner as to ensure a good utilization of the tobacco.

What I claim is:

1. The machine for automatically forming strips from tobacco leaves for wrapping cigars comprising means for carrying the midrib and means for spreading out the parenchyma of each leaf, means for receiving and conveying the outspread leaves, means for longitudinal cutting of the out-spread leaves into strips, means for detecting holes or absences of paraenchyma, means for measuring the length of strips, means for transverse cutting of each strip into sections, said cutting means being controlled by said detection means and by said measuring means, and means for joining sections of insufficient length so as to re-form sections of sufficient length.

2. The machine of claim 1 in which the means for carrying the midrib consists of an endless belt against which the midrib is pressed under the action of spring-loaded push-plates.

3. The machine of claim 1 in which the means for spreading out the parenchyma consist of a box with walls located at a small distance away from each other, between which the leaf is intended to pass and in which a partial vacuum is maintained, said walls being pierced with holes for the admission of air which have a fairly large area in the vicinity of the axis of displacement of the midrib and a smaller area starting from a certain distance away from said axis.

4. The machine of claim 1 in which the means for receiving and conveying outspread leaves consist of a movable supporting member pierced over its entire supporting surface with uniformly spaced holes arranged in rows parallel to the axis of said drum and set at a uniform distance apart, suction means being provided for the purpose of maintaining the outspread leaf against said surface as it is delivered from the spreading-out means.

5. The machine of claim 1 in which the longitudinal cutting means consist of series of cutters adapted to be applied against the means for receiving and conveying the outspread leaves and to cut parallel strips thereon.

6. The machine of claim 1 in which the means for detecting the absence of tobacco and re-appearance of tobacco on the means for receiving and conveying the outspread leaves comprise a plurality of rotating mirrors illuminated by a parallel beam of light for sweeping the width of each strip, and photoelectric cells energized by the rays which are received from said mirrors but reflected from said receiving and conveying means, and electric means designed to receive the pulses emitted by said photoelectric cells when the latter are energized, that is to say when no tobacco is present on the corresponding strips.

7. The machine of claim 1 in which the means for effecting the transverse cutting of the different strips consist of rotary cutters with helical cutting edges having a width equal to that of the corresponding strips and so arranged as to cut said strips while being brought into contact therewith in a line which is inclined with respect to the midrib of the leaf.

8. The machine of claim 1 in which the means for joining those sections of strips which are of insufficient length and for reconstituting sections of sufficient length comprised of conveyor belts corresponding in number to the number of cut strips, said conveyor belts being adapted to withdraw sections of insufficient length which have been cut as soon as said sections are released, said conveyor belts being provided with disengageable drive means controlled as a function of the time which has elapsed between the transverse cutting operations before and after a zone in which no tobacco is present.

9. The machine of claim 1 which further comprises an electronic control circuit consisting of two pulse counters and two "AND" gates controlled by a bistable multivibrator and arranged on the one hand so as to cancel the counting of pulses for measuring strip lengths each time the count reaches a value corresponding to the length of strip which is required for the wrapping of a cigar and, on the other hand, so as to deflect said measuring pulses from the strip length counter as soon as the absence of tobacco is detected, a certain number of pulses corresponding to the length of overlap which is necessary for the sections to be joined being also reflected from the counting means after re-appearance of the tobacco.

10. The machine of claim 9 further comprising a storage system consisting of studded discs with two positions for recording the pulses supplied when the tobacco is present and for controlling the joining of the overlapping ends of complementary strip sections and the means for joining sections of insufficient length and re-forming sections of sufficient length.

11. The machine of claim 10 in which the transverse cutting means are designed to come into operation at each pulse-deflection and on completion of the counting which corresponds to the desired strip.

12. The machine for automatically forming strips from tobacco leaves for wrapping cigars comprising conveyor means for carrying the midrib and suction means for spreading-out the parenchyma of each leaf, a rotatable drum for receiving, supporting and conveying said outspread leaves, said drum being pierced over its entire supporting surface with uniformly spaced holes arranged in rows parallel to the axis of said drum and set at a uniform distance apart, suction means being provided for the purpose of maintaining the outspread leaf against said surface as it is delivered from the spreading-out means, circular cutters adapted to be applied against parallel tracks of said perforated drum and to cut thereon parallel strips each corresponding to one of said tracks, a disc adapted to rotate at the same angular speed as the drum and on the periphery of which are formed a number of notches equal to the number of rows of holes formed in said drum, a light source and a photoelectric cell located on each side of said disc at the level of the notches thereof, and means for counting rhythmical pulses which are emitted by said photoelectric cell and the value of which in units of time corresponds to the time-duration of the sweeping by stationary detection means of the surface which is comprised between two rows of perforations of the drum which are parallel to the axis of said drum, rotating mirrors illuminated by a parallel beam of light for sweeping the width of each track, and photoelectric cells energized by the rays which are derived from said mirrors but reflected from said drum and electric means designed to receive the pulses emitted by said photoelectric cells when the latter are energized, that is to say when no tobacco is present on said drum, rotary cutters with helical cutting edges having a width equal to that of the corresponding track and so arranged as to cut said strips while being brought into contact with said drum in a line which is inclined with respect to the central plane of said drum, a plurality of conveyor belts corresponding in number to the number of said tracks, said conveyor belts being adapted to withdraw sections of insufficient length which have been cut on said drum as soon as said sections are released from said drum, said conveyor belts being provided with disengageable drive means controlled as a function of the time which has elapsed between the transverse cutting operations before and after a zone in which no tobacco is present, and means for automatically controlling said drive means.

13. The machine of claim 12 in which said controlling means are electronic control means consisting of two pulse counters and two "AND" gates controlled by a bistable multivibrator and arranged on the one hand so as to cancel the counting of pulses for measuring strip lengths each time the count reaches a value corresponding to the length of strip which is required for the wrapping of a cigar and, on the other hand, so as to deflect said measuring pulses from the counter as soon as the absence of tobacco is detected, a certain number of pulses corresponding to the length of overlap which is necessary for the sections to be joined being also deflected from the counting means after re-appearance of the tobacco.

14. The machine of claim 13 further comprising a storage system consisting of studded discs with two positions for recording the pulses supplied when the tobacco is present and for controlling the joining of the overlapping ends of complementary strip sections and the means for joining sections of insufficient length and reforming sections of sufficient length, and the transverse cutting means are designed to come into operation at each pulse-deflection and on completion of the counting which corresponds to the desired strip.

References Cited

UNITED STATES PATENTS

| | | | |
|---|---|---|---|
| 180,951 | 8/1976 | Smothers | 131—113 |
| 1,864,765 | 6/1932 | Rundell et al. | 131—123 |
| 2,617,483 | 11/1952 | Porter | 131—21 X |
| 2,953,135 | 9/1960 | Anderson | 131—21 |

FOREIGN PATENTS

| | | |
|---|---|---|
| 595,005 | 3/1934 | Germany. |
| 673,047 | 3/1939 | Germany. |
| 282,364 | 3/1928 | Great Britain. |
| 331,333 | 7/1930 | Great Britain. |

ALDRICH F. MEDBERY, *Primary Examiner.*